(12) United States Patent
Ramakrishnan et al.

(10) Patent No.: US 9,805,750 B1
(45) Date of Patent: Oct. 31, 2017

(54) DATA STORAGE LOADBEAM STIFFENING FEATURE

(71) Applicant: Seagate Technology LLC, Cupertino, CA (US)

(72) Inventors: Narayanan Ramakrishnan, Eden Prairie, MN (US); Vijay Kumar, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/192,407

(22) Filed: Jun. 24, 2016

(51) Int. Cl.
 *G11B 5/48* (2006.01)

(52) U.S. Cl.
 CPC ............ *G11B 5/4833* (2013.01); *G11B 5/484* (2013.01)

(58) Field of Classification Search
 CPC ........ G11B 5/4833; G11B 5/484; G11B 21/16
 See application file for complete search history.

(56) References Cited

U.S. PATENT DOCUMENTS

| | | | | |
|---|---|---|---|---|
| 4,996,616 A | * | 2/1991 | Aoyagi | G11B 5/4833 360/244.9 |
| 5,126,904 A | * | 6/1992 | Sakurai | G11B 5/4833 360/244.2 |
| 5,313,353 A | * | 5/1994 | Kohso | G11B 21/16 360/244.2 |
| 5,408,372 A | * | 4/1995 | Karam, II | G11B 5/4833 360/244.2 |
| 5,570,261 A | | 10/1996 | Frater et al. | |
| 5,677,815 A | * | 10/1997 | Chan | G11B 5/4833 360/264.2 |
| 5,719,727 A | * | 2/1998 | Budde | G11B 5/54 360/244.9 |
| 5,731,931 A | * | 3/1998 | Goss | G11B 21/21 360/244.9 |
| 5,734,526 A | | 3/1998 | Symons | |
| 5,793,569 A | | 8/1998 | Christianson et al. | |
| 5,808,836 A | | 9/1998 | Frater et al. | |
| 5,815,348 A | * | 9/1998 | Danielson | G11B 5/4833 360/244.9 |
| 5,850,319 A | * | 12/1998 | Tangren | G11B 5/4833 360/244.9 |
| 5,894,381 A | * | 4/1999 | Allen | G11B 5/4833 360/244.9 |
| 5,949,617 A | * | 9/1999 | Zhu | G11B 5/4833 360/244.8 |
| 5,953,180 A | * | 9/1999 | Frater | G11B 5/4826 360/234.3 |
| 5,973,883 A | * | 10/1999 | Yanagisawa | G11B 5/4833 360/244.9 |
| 5,995,335 A | * | 11/1999 | Jurgenson | G11B 5/4833 360/244.8 |
| 6,141,187 A | * | 10/2000 | Wong | G11B 5/4833 360/244.8 |
| 6,144,530 A | * | 11/2000 | Shiraishi | G11B 5/484 360/244.1 |

(Continued)

*Primary Examiner* — Brian Miller
(74) *Attorney, Agent, or Firm* — Hall Estill Attorneys at Law

(57) ABSTRACT

A data storage device can have a suspension with a loadbeam. The loadbeam can be configured with one or more a stiffening features. The loadbeam and stiffening feature may be constructed as products of a single piece of material. The stiffening feature can be defined by a varying thickness of the loadbeam.

20 Claims, 3 Drawing Sheets

(56) References Cited

U.S. PATENT DOCUMENTS

| | | | |
|---|---|---|---|
| 6,219,203 B1* | 4/2001 | Arya | G11B 5/484 360/244.2 |
| 6,297,933 B1* | 10/2001 | Khan | G11B 5/4833 360/244.2 |
| 6,307,715 B1* | 10/2001 | Berding | G11B 5/4833 360/244.8 |
| 6,433,967 B1* | 8/2002 | Arya | G11B 5/4826 360/244.8 |
| 6,556,382 B1* | 4/2003 | Tangren | G11B 5/484 360/244.8 |
| 6,639,757 B2* | 10/2003 | Morley | G11B 5/4833 360/244.1 |
| 6,728,072 B1 | 4/2004 | Van Sloun et al. | |
| 6,731,465 B2* | 5/2004 | Crane | G11B 5/484 360/244.3 |
| 6,801,405 B2* | 10/2004 | Boutaghou | G11B 5/484 360/265.9 |
| 6,934,125 B2* | 8/2005 | Takagi | G11B 5/4813 360/244.8 |
| 7,038,885 B2* | 5/2006 | Erpelding | G11B 5/4833 360/244 |
| 7,064,931 B2* | 6/2006 | Hutchinson | G11B 5/4833 360/244.8 |
| 7,068,470 B1* | 6/2006 | Hadian | G11B 5/484 360/244.8 |
| 7,149,057 B2* | 12/2006 | Murphy | G11B 5/6005 360/244.8 |
| 7,170,717 B2* | 1/2007 | Kuwajima | G11B 5/6005 360/244.2 |
| 7,218,479 B2* | 5/2007 | Kuwajima | G11B 5/4833 360/244.5 |
| 7,352,533 B1 | 4/2008 | Bjorstrom | |
| 7,365,944 B2* | 4/2008 | Fujimoto | G11B 5/4833 360/244.2 |
| 7,430,096 B1* | 9/2008 | Bjorstrom | G11B 5/4833 360/244.9 |
| 7,466,517 B2* | 12/2008 | Isom | G11B 5/484 360/244.3 |
| 7,477,487 B1* | 1/2009 | Miller | G11B 5/4833 360/244.3 |
| 7,551,400 B2* | 6/2009 | Renken | G11B 5/4833 360/244.9 |
| 7,701,672 B2* | 4/2010 | Zeng | G11B 5/4833 360/244.9 |
| 8,416,531 B2* | 4/2013 | Benda | B29C 45/14344 360/244.9 |
| 2002/0051319 A1* | 5/2002 | Takagi | G11B 5/4813 360/244.9 |
| 2002/0085313 A1* | 7/2002 | Boutaghou | G11B 5/4833 360/244.9 |
| 2009/0316305 A1* | 12/2009 | Ono | G11B 5/4833 360/244.2 |
| 2012/0014241 A1 | 1/2012 | Yip et al. | |

* cited by examiner

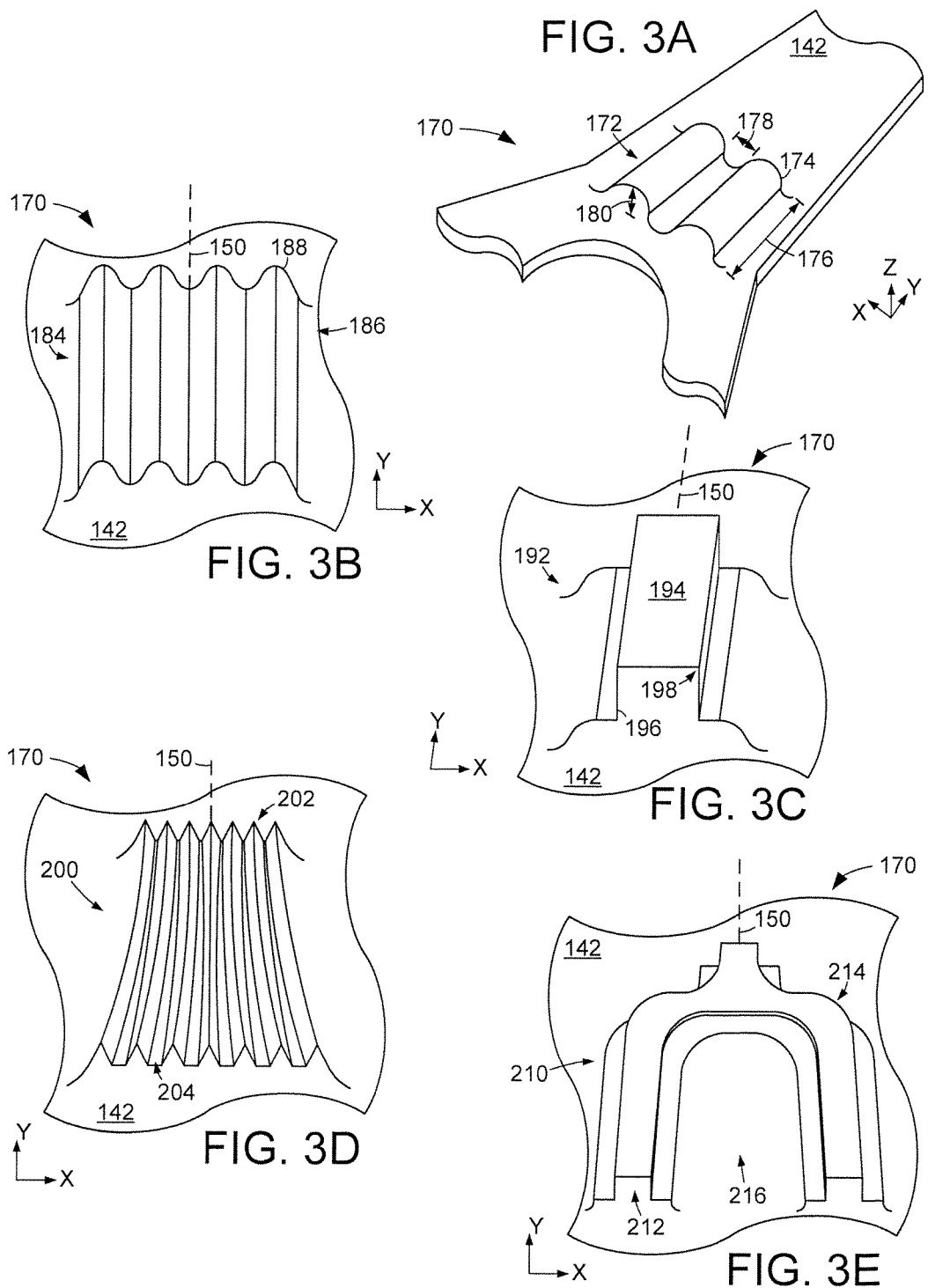

DATA STORAGE LOADBEAM STIFFENING FEATURE

SUMMARY

A data storage device, in some embodiments, has a suspension with a loadbeam configured with a stiffening feature. The loadbeam and stiffening feature are products of a single piece of material with the stiffening feature defined by a varying thickness of the loadbeam.

BRIEF DESCRIPTION OF THE DRAWINGS

FIGS. 3A-3F respectively depict line representations of example stiffening features that may be employed in the data storage system of FIG. 1.

DETAILED DESCRIPTION

Consumer and industry have demanded larger data capacity in data storage devices, such as rotating media hard disk drives (HDD) and hybrid data storage. Increased data capacity results in greater data density and a heightened sensitivity to data transducer movement relative to a magnetic data storage medium. Hence, the ability for position and maintain a data transducer over a specific data track, and series of data bits, corresponds to the available data capacity, and performance, of a data storage device.

With a data storage device's performance being increasingly sensitive to the position of a data transducer, the operating frequency of a micro-actuator affects the micro-actuation bandwidth and the tracking capability of a data transducer. For instance, transducer response modes close to the operating frequency of the micro-actuator can result in phase loss and bandwidth reduction. Thus, it is a continued goal to mitigate the effect of transducer response modes by adding dampening to, or stiffening of portion of the head-gimbal assembly, of a data storage device.

It is noted that portions of a micro-actuator can receive added dampening, or stiffening, via the positioning of supplemental materials, such as with layers that are permanently bonded or temporarily adhered to the micro-actuator. However, the addition of dampening materials is expensive in terms of time to organize, assemble, and test a modified micro-actuator. Further In some cases, the added dampers, such as constrained-layer dampers or glued stiffeners, can also exhibit behavior and performance that are sensitive to temperature changes. Process variations due to assembly tolerances for the added dampers or stiffeners may also result in variation across parts of the servo-tracking performance, which in turn could be detrimental to tuning the servo-controller for optimal tracking performance.

In various present embodiments, stiffness is added at least to a loadbeam portion of a micro-actuator with a stiffening feature that is formed in a single piece of the loadbeam material without any additional bonding or adhesion fabrication. Such a stiffening feature reduces the response gains of head-gimbal assembly structural modes in a data storage device without increasing device fabrication time and complexity.

Figure 1:
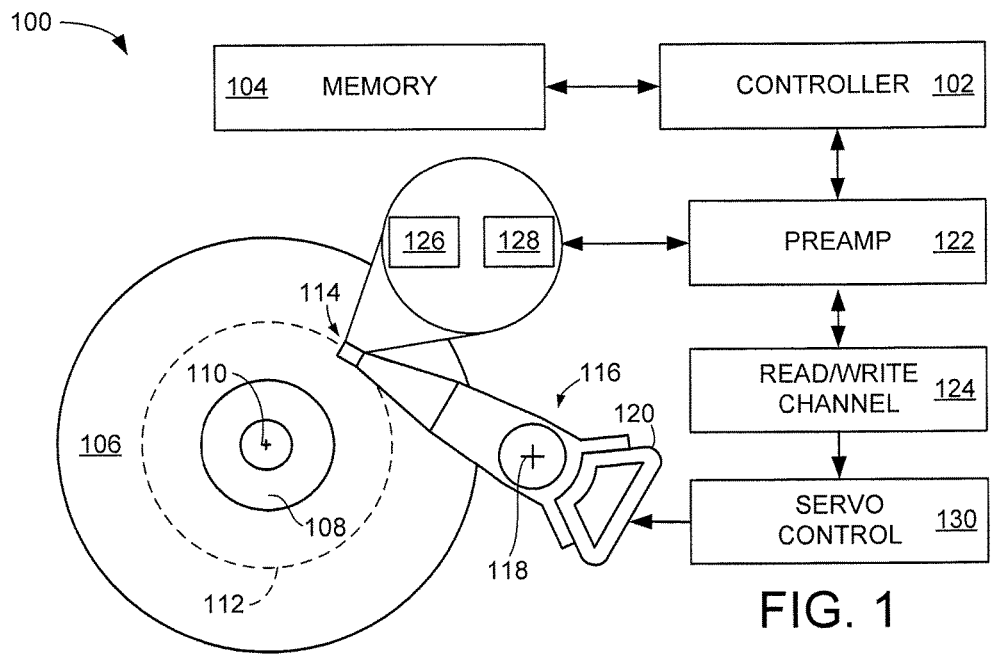
FIG. 1 is a block representation of an example data storage system arranged in accordance with various embodiments.

FIG. 1 is a block representation of an example data storage system 100 in which embodiments of the present disclosure can be employed. The data storage system 100 can employ one or more data storage devices that each have a controller 102, such as a microcontroller, microprocessor, or application specific integrated circuit (ASIC), and a local memory module 104. The controller 102 can be a fixed or programmable processor based control circuit that provides top level communication and control functions as the device interfaces with one or more local and/or remote host devices, such as a network node. Data from a host device is transferred for storage into the memory 104, which can take a variety of volatile and/or non-volatile configurations.

Various embodiments arrange at least one magnetic rotatable data storage medium 106 into a HDD where the medium 106 is rotated at a predetermined speed by a spindle motor 108 at a constant high velocity about a central axis 110. A plurality of concentric data tracks, such as track 112, are defined on the various disk recording surfaces and accessed by a corresponding transducing head 114 that is positioned over a selected tack by a rotary micro-actuator assembly 116 that pivots about a central actuator axis 118 in response to a voice coil motor 120. IN other HDD designs, the controller 102 and micro-actuator 116 can be dual-stage, or more generally multi-stage. For example, a primary stage can be a voice-coil motor actuated servo system that actuates the entire head-stack assembly in which the head-gimbal assembly resides while a second stage could be a micro-actuator system that has a wider and larger maximum frequency response. Such multi-stage micro-actuation systems afford increased servo bandwidth and improved tracking performance resulting in increased recording areal density.

Controlled application of current to the voice coil motor 120 induces controlled rotation of the micro-actuator 116 about axis 118 and radial movement of the head(s) 114 across the disk surfaces. A preamplifier/driver circuit (preamp) 122 is operably coupled to each of the heads 114 and may be mounted, for example, to a side of the actuator assembly 116. Data transfers between a host device and the disks 106 are carried out using the preamp 122 and a read/write channel 124. During a data write operation, data to be written to the disks is buffered from the host, and encoded by the read/write channel 124 to supply a frequency modulated write signal which is supplied to the preamp 122. The preamp 122 generates and applies bi-directional write currents to one or more write elements 126 of the associated head 114 to write the data in the form of a sequence of magnetic flux transitions in a recording layer of the associated disc.

During a subsequent read operation, a read sensor 128 is aligned with a corresponding track 112 on which the data to be retrieved is resident. The transducing head 114 outputs a readback signal which is preconditioned by the preamp 122 and processed by the read/write channel 124 to recover the originally written data. The readback data are placed in a buffer memory pending transfer to the requesting host device. A servo control circuit 130 may provide closed loop positional control of the respective heads 114 during read and write operations. Generally, movement of the micro-actuator 116 in response to data access operations as well as positional operations, such as position error correction, can produce operating modes that degrade the ability of the micro-actuator to consistently follow a data track 112.

Figure 2A:
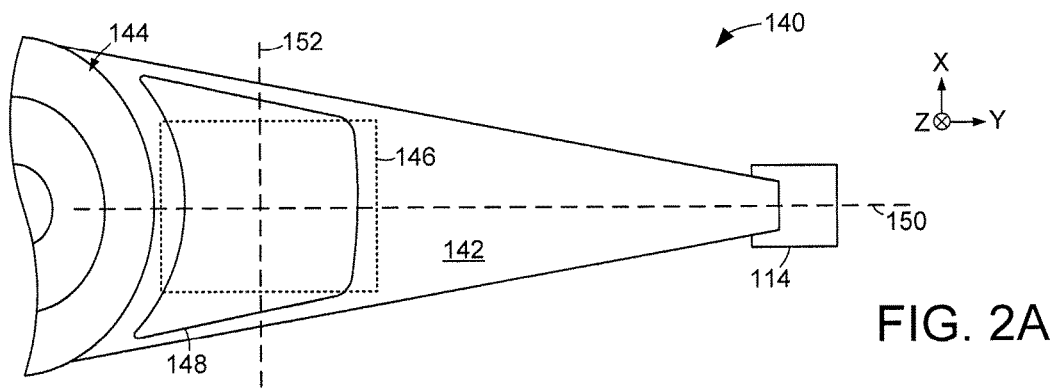
FIGS. 2A and 2B respectively show portions of an example actuating assembly capable of being used in the data storage system of FIG. 1.
Figure 2B:
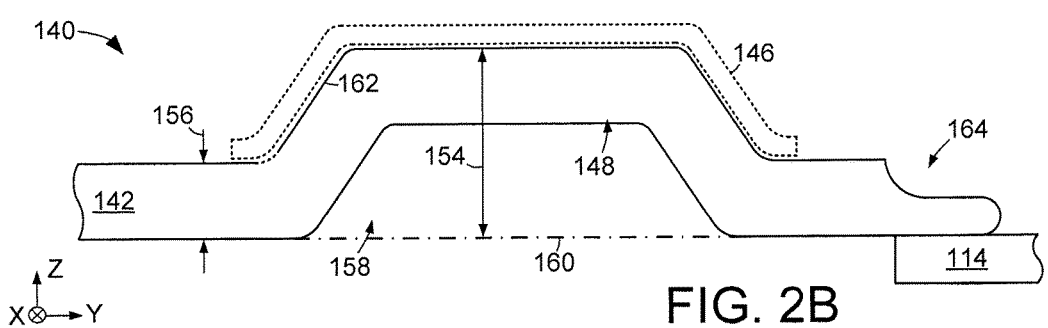

FIGS. 2A and 2B respectively display side and top view line representations of portions of an example actuating assembly 140 that can be utilized in the data storage system 100 of FIG. 1 to dampen and mitigate micro-actuator modes. FIG. 2A illustrates how a loadbeam 142 can connect a transducing head 114 with an actuator body 144. It is noted that the actuating assembly 140 can alone, or in combination with other components, be characterized as a suspension for a data storage device that allows the head 114 to fly on an air bearing to access data bits of a data track.

The elongated shape of the loadbeam 142 along the Y axis can result in vibration and oscillations that can degrade the accuracy of head 114 positioning. While supplemental materials can be attached to the loadbeam 142, as shown by segmented region 146, the additional materials can exhibit performance variation due to temperature sensitivity as well as assembly process tolerances and variations and, as a result, further degrade the performance of the actuating assembly 140. In some embodiments, a portion of the loadbeam 142 is formed into a stiffening feature 148 that mitigates the effects of loadbeam vibration and movement.

In accordance with various embodiments, the stiffening feature 148 is formed as a continuous extension of the loadbeam 142. That is, the stiffening feature 148 is a portion of the single piece of material that also provides the loadbeam 142. The stiffening feature 148 can be any size, shape, and position on the loadbeam 142. As shown in FIG. 2A, the stiffening feature 148 can be positioned proximal the actuator body 144 and distal the head 114 with a shape that is symmetrical about the longitudinal axis 150 of the loadbeam 142 while being asymmetric about the transverse axis 152 of the loadbeam 142. Although, other symmetrical and asymmetrical stiffening feature shapes can also be utilized.

The shape and size of the stiffening feature 148 may be tuned along with the number of separate stiffening feature regions to alter the resonance frequency of the loadbeam 142 while increasing the stability and data track performance. That is, the stiffening feature 148 may consist of more than one separate regions that have similar, or dissimilar, shapes and sizes. It is contemplated that the stiffening feature 148 may comprise a plurality of separate regions that are collectively symmetric about the longitudinal axis 150, transverse axis 152, or both. The geometry and location of the stiffener features 148 can be optimized around reducing the gains of specific structural modes with the goal of improving micro-actuation (closed-loop servo) bandwidth and tracking performance of the transducer 114. This, in turn, enables higher data track density and therefore higher recording areal density.

In the cross-sectional view representation of FIG. 2B, the stiffening feature 148 is illustrated as an area of varying loadbeam thickness 154. In other words, the loadbeam 148 has a uniform thickness 156 that changes around a notch 158 to the varied thickness 154 to define the stiffening feature 148. It is noted that the varied thickness 154 is measured from the same common bottom plane as the uniform thickness 156, as shown by segmented line 160. To clarify, the stiffening feature 148 can be a raised portion of the loadbeam 142 that is vertically aligned with the notch 158, along the Z axis, and corresponds with the larger loadbeam thickness 154, as measured from the bottom plane 160.

The varied stiffening feature thickness 154 can transition to the uniform thickness 156 via one or more smooth transition surfaces 162, which differs from dampening materials that are bonded or attached to the loadbeam 142 instead of being formed into the same piece of material as the loadbeam 142. For instance, the segmented region 146 conveys how a dampening material sharply transitions in a non-smooth manner to the loadbeam thickness 156. It is noted that the loadbeam thickness 156 other than the stiffening feature 148 may be uniform, or vary, such as with the depression 164 proximal the transducing head 114. For example, one or more recesses, notches, protrusions, or ridges can be incorporated into the loadbeam 142 in addition to, and separate from, the stiffening feature 148.

Figure 3F:
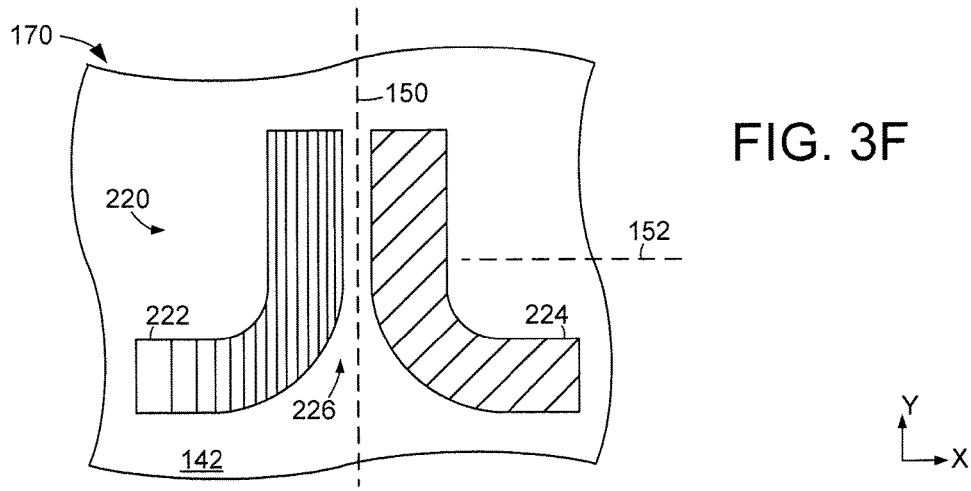

FIGS. 3A-3F respectively display assorted example stiffening features that can be incorporated into a loadbeam 142 as part of a data storage device suspension 170. FIG. 3A represents an example stiffening feature 172 that has a continuously curvilinear profile defined by a smooth surface 174. While not required, the stiffening feature 174 is coined to provide a predetermined design that has a resolution of 1 mm or less. That is, the stiffening feature 172 is impacted to imprint a particular design into the material of the feature 172 and loadbeam 142 that has a length 176, width 178, and/or depth 180 that measures 1 mm or less.

In the non-limiting example of FIG. 3A, the predetermined stiffening design provides separated ridges 182 that respectively have a depth of less than 1 mm. It is contemplated that the stiffening design, and stiffening feature 142 as a whole, can be formed in a variety of different manners, such as casting, stamping, coining, and printed. The ability to use one or more stiffening feature formation techniques allows fabrication time to be balanced with the stiffening feature detail to optimize loadbeam 142 performance for a diverse variety of data storage environments. For instance, the ability to construct less than 1 mm resolution in a stiffening design can provide increased loadbeam 142 stability that is conducive to high areal data bit density data storage devices.

In contrast, the bonding or attachment of materials to a loadbeam 142 cannot be easily adapted to diverse data storage environments due to the pre-fabrication of components that are subsequently attached to a loadbeam 142. As a non-limiting example, the loadbeam 142 can be printed as a single piece of material in a single fabrication step that can be adapted quickly and efficiently while the bonding of material to a loadbeam requires the construction of the bonded component prior to assembly, which makes adaptations more difficult and time consuming.

It is noted that the stiffening design of FIG. 3A is not required or limiting. FIG. 3B illustrates another example stiffening feature 184 with a stiffening design 186 that presents a plurality of separate ridges 188 each aligned with the longitudinal axis 150 of the loadbeam 142. With one or more coining and/or stamping techniques, the assorted ridges 188 can be configured with similar, or differing, depths 180 and widths 178 to customize the resonance frequency, dampening capabilities, and overall rigidity of the loadbeam 142.

FIG. 3C represents another example stiffening design 190 formed atop a stiffening feature 192 with a single protrusion 194. The use of one or more formation techniques can produce the rectangular protrusion shape defined by linear sidewalls 196 and right angle corners 198. Through various embodiments, a stiffening feature design can concurrently have the rectangular protrusion of FIG. 3C with one or more continuously curvilinear ridges of FIGS. 3A and 3B to provide sophisticated and robust tuning of the loadbeam's 142 response to movement and vibration. Hence, it is noted that multiple different design aspects can be combined in a stiffening design to optimize data storage device performance.

FIG. 3D is a top view of an example stiffening feature 200 that shows how a plurality of triangular protrusions 202 are connected by rectangular notches 204 each with at least one dimension that is less than 1 mm, which corresponds to a 1 mm or less design resolution. The ability to combine differently shaped aspects, such as with linear and curvilinear surfaces, allows a stiffening feature to be tuned for airflow as well as loadbeam mechanical response. In the example stiffening design of feature 200, the combination of different shapes complements the symmetric configuration about the longitudinal loadbeam axis 150 to tune the mechanical and airflow behavior of the loadbeam 142.

FIG. 3E conveys an example stiffening feature 210 that employs multiple elevated regions 212, such as a protrusion or ridge, configured into a complex design. As shown, the stiffening feature 210 has separated elevated regions 212 that are each oriented along multiple different axis with respect to the longitudinal axis of the loadbeam 142. Although not limiting, the embodiment of FIG. 3E shows how elevated regions 212 form a bend 214, which can be an acute, right, or obtuse angle. Such a bend 214 can enhance the separation of the elevated regions 212 by a flat portion 216 of the stiffening feature 210 to alter the dampening characteristics of the loadbeam 142, such as lowering the resonance frequency.

As displayed by FIGS. 3A-3E, the varying thickness, stiffening feature, portion of a loadbeam 142 is a blank canvas that can be tuned with one or more stiffening designs that further optimize the stability and oscillation mitigation in the loadbeam 142. FIG. 3F displays an example stiffening feature 220 that employs separate and different stiffening regions. While any number of stiffening regions can be employed, a first stiffening region 222 of stiffening feature 220 is separated from a second stiffening region 224 by a flat, non-coined, region 226.

The first stiffening region 222 has a different configuration than the second stiffening region 224, but such is not required as the regions can be the same configuration and/or be symmetric about the longitudinal axis 150. It is noted that the stiffening regions 222 and 224 can have any overall or stiffening design shape and size. For instance, the first stiffening region 222 can have a rectangular shaped protrusion while the second stiffening region 224 has multiple curvilinear ridges. Regardless of the configuration of the respective stiffening regions 222 and 224, the ability to tune different separate regions allows dampening to be controlled differently along the transverse axis 152 of the loadbeam 142.

Through the various stiffening feature configurations shown and discussed in FIGS. 3A-3F, a single piece of material can be easily and efficiently formed with at least one stiffening design that enhances the performance of the loadbeam 142 and, as a result, the performance of a data storage device. The ability to tune a stiffening feature's design allows a basic loadbeam blank to be used to form a stiffening feature, which contrasts complex loadbeam assemblies that increase manufacturing time and risk of improper assembly. Thus, the use of formation techniques to form a stiffening feature from a common loadbeam blank optimizes the fabrication time and reliability of a data storage suspension.

Figure 4:
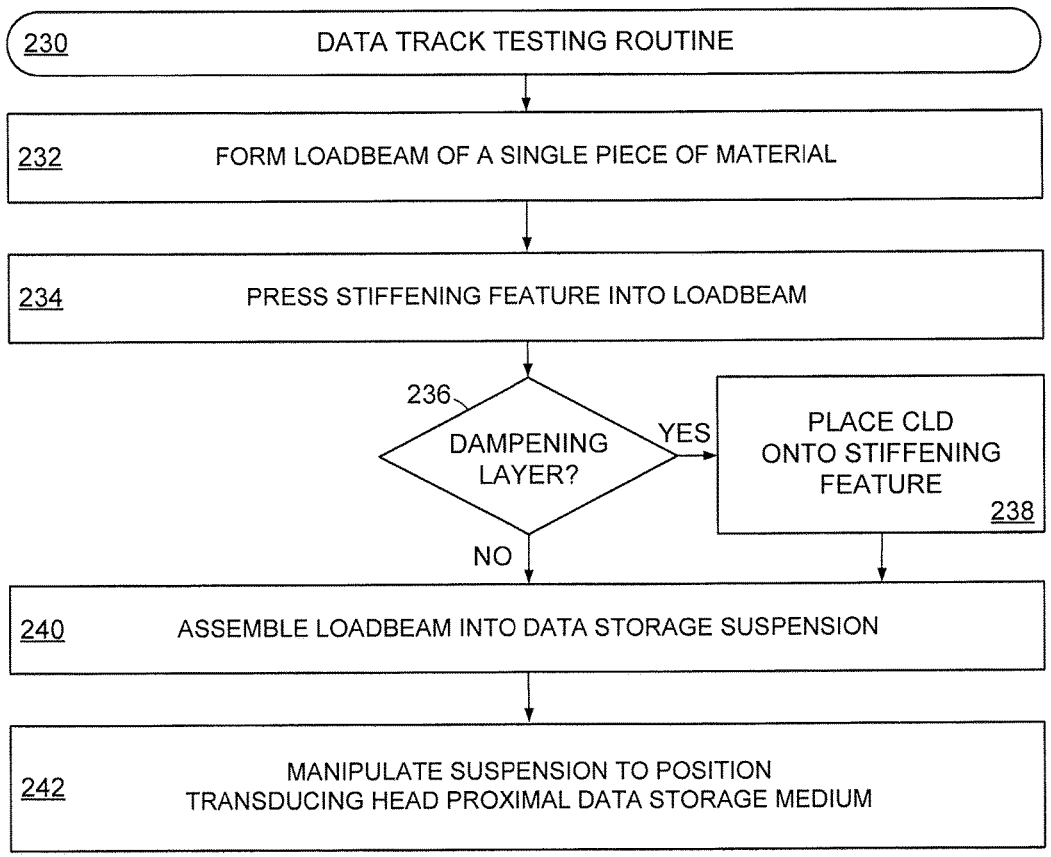
FIG. 4 provides a flowchart for an example toolless device installation routine performed in accordance with various embodiments.

FIG. 4 is a flowchart of an example data storage device fabrication routine 230 that can be carried out to produce a loadbeam with one or more stiffening features in accordance with various embodiments. A loadbeam blank is initially formed of a single piece of material in step 232. The loadbeam material may be metallic or plastic and can be formed via casting, printing, extrusion, or any other material construction techniques.

Next, a stiffening feature is created in step 234. In one embodiment, the stiffening feature is formed in step 234, which would benefit torsion modes (1T and 3T) via the addition loadbeam stiffness. In another embodiment, the stiffening feature is stamped in step 234 near the root of the loadbeam, which would benefit sway modes the most. It is noted that the pressing of the blank can entail any number, and type, of material deformation techniques, such as stamping, that produce a varying loadbeam thickness, and perhaps a notch vertically aligned with the varying loadbeam thickness. At the conclusion of step 234, the stiffening feature is a part of the single piece of loadbeam material. In other words, the stiffening feature and the overall loadbeam are comprised of a common, single piece of material.

While routine 230 can terminate after step 232 with a stiffening feature being formed in the loadbeam, various embodiments conduct additional formation steps to produce stiffening designs atop the stiffening feature. Decision 236 evaluates if one or more dampening layers, such as layer 146, are to be affixed atop the stiffening feature formed in step 234. If so, step 238 places at least one constrained-layer dampener (CLD) onto the stiffening feature. It is noted that a CLD can continuously extend beyond the stiffening feature to contact a uniform thickness portion of the loadbeam.

At the conclusion of step 238, or if no dampening layer is to be installed, step 240 proceeds to assemble the loadbeam into a data storage suspension, which may involve temporarily and/or permanently attaching components together. For example, a slider, dimple, and transducing head may be assembled to contact each other and the loadbeam to allow data access operations across an air bearing. Such data access operations can correspond with step 242 manipulating the data storage suspension via a voice coil and/or piezoelectric transducing means to position the transducing head over a selected data track and series of data bits.

It is noted that the various aspects of routine 230 are not required or limiting. As such, any aspect can be changed or removed and any number of steps and decisions can be added. Through the execution of routine 230, a stiffening feature is constructed out of the common, single piece, material as the loadbeam. The ability to form the stiffening feature with a diverse variety of shapes, sizes, and surface designs allows the loadbeam to be customized to a data storage environment to optimize loadbeam stability while mitigating oscillations and vibrations that degrade actuation performance.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. A system comprising a data storage device having a suspension with a loadbeam, the loadbeam comprising a stiffening feature, the loadbeam and stiffening feature being products of a single piece of material, the stiffening feature defined by a varying thickness of the loadbeam and coined with a stiffening design having a plurality of ridges, the stiffening design having a resolution of one millimeter or less.

2. The system of claim 1, wherein the suspension is part of an actuating assembly of the data storage device.

3. The system of claim 1, wherein the stiffening feature has a symmetric shape along a longitudinal axis of the loadbeam.

4. The system of claim 1, wherein the stiffening feature has an asymmetric shape along a transverse axis of the loadbeam.

5. The system of claim 1, wherein the loadbeam positions a transducing head proximal a data bit stored on a data storage medium of the data storage device.

6. The system of claim 1, wherein the stiffening feature has a uniform thickness.

7. The system of claim 1, wherein at least one damper layer is positioned atop the stiffening feature.

8. The system of claim 7, wherein the at least one damper layer continuously spans the stiffening feature and a portion of the loadbeam between the stiffening feature and a slider.

9. The system of claim 8, wherein the at least one damper layer comprises a material dissimilar from the loadbeam's single piece of material.

10. The system of claim 1, wherein the stiffening feature is a protrusion of the loadbeam that is not welded or bonded to the loadbeam.

11. An apparatus comprising a data storage device having a suspension with a loadbeam, the loadbeam comprising a first stiffening feature, the loadbeam and first stiffening feature being products of a single piece of material, the first stiffening feature defined by a first varying thickness of the loadbeam and a second varying thickness of the loadbeam, the stiffening feature coined with a stiffening design comprising a plurality of ridges having a resolution of one millimeter or less, the plurality of ridges each oriented parallel to a longitudinal axis of the loadbeam.

12. The apparatus of claim 11, wherein the loadbeam has a second stiffening feature that is a product of the single piece of material.

13. The apparatus of claim 12, wherein the first and second stiffening features are separated on the loadbeam.

14. The apparatus of claim 11, wherein each of the plurality of ridges continuously extend away from the loadbeam.

15. The apparatus of claim 11, wherein the first stiffening feature is aligned with a notch in the loadbeam.

16. The apparatus of claim 11, wherein the plurality of ridges of the stiffening design each have a length, width, and depth measuring one millimeter or less.

17. The apparatus of claim 11, wherein the first stiffening feature transitions smoothly to the first varying thickness.

18. A method comprising:
presenting a loadbeam comprising a single piece of material;
forming a stiffening feature in the loadbeam, the stiffening feature defined by a varying thickness of the loadbeam;
coining a stiffening design into the stiffening feature, the stiffening design having a plurality of ridges having a resolution of one millimeter or less and
assembling the loadbeam into a suspension of a data storage device.

19. The method of claim 18, wherein the stiffening feature is stamped into the single piece of material.

20. The method of claim 18, wherein the stiffening feature is covered by and contacts a constrained-layer damper.

\* \* \* \* \*